United States Patent
Yamada et al.

(10) Patent No.: US 9,550,171 B2
(45) Date of Patent: Jan. 24, 2017

(54) EXHAUST GAS PURIFICATION CATALYST AND METHOD FOR MANUFACTURING SAME

(71) Applicant: MAZDA MOTOR CORPORATION, Hiroshima (JP)

(72) Inventors: Hiroshi Yamada, Hiroshima (JP); Koichiro Harada, Hiroshima (JP); Takashi Baba, Hiroshima (JP); Masahiko Shigetsu, Higashi-Hiroshima (JP); Akihide Takami, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/913,190

(22) PCT Filed: Jul. 17, 2014

(86) PCT No.: PCT/JP2014/003808
§ 371 (c)(1),
(2) Date: Feb. 19, 2016

(87) PCT Pub. No.: WO2015/029320
PCT Pub. Date: Mar. 5, 2015

(65) Prior Publication Data
US 2016/0193593 A1 Jul. 7, 2016

(30) Foreign Application Priority Data
Aug. 29, 2013 (JP) ................................. 2013-178471

(51) Int. Cl.
*B01J 23/00* (2006.01)
*B01J 23/02* (2006.01)
(Continued)

(52) U.S. Cl.
CPC ................. *B01J 23/63* (2013.01); *B01D 53/94* (2013.01); *B01D 53/944* (2013.01); *B01J 23/42* (2013.01);
(Continued)

(58) Field of Classification Search
CPC ........... B01J 21/04; B01J 21/066; B01J 23/10; B01J 23/42; B01J 23/63; B01J 35/0006; B01J 35/04; B01J 35/1061; B01J 35/1066; B01J 37/04
(Continued)

(56) References Cited

U.S. PATENT DOCUMENTS 6,492,297 B1    12/2002   Sung
6,821,412 B1 *  11/2004   Fujukawa ................ B01J 21/04
                                                       208/210

(Continued)

FOREIGN PATENT DOCUMENTS

CN    1473651 A        2/2004
JP    2004-508186 A    3/2004
(Continued)

OTHER PUBLICATIONS

International Search Report issued in PCT/JP2014/003808; mailed Sep. 9, 2014.
(Continued)

*Primary Examiner* — Cam N. Nguyen
(74) *Attorney, Agent, or Firm* — Studebaker & Brackett PC (57) ABSTRACT

An exhaust gas purification catalyst is disposed in an exhaust gas channel of an engine and includes a catalytic layer 22 provided on a substrate 21. The catalytic layer 22 contains multiple types of γ-aluminas 23 and 24 which are different in composition and Pt 25 loaded on the multiple types of γ-aluminas 23 and 24.

6 Claims, 8 Drawing Sheets

(51) Int. Cl.

| | |
|---|---|
| *B01J 23/08* | (2006.01) |
| *B01J 23/10* | (2006.01) |
| *B01J 23/40* | (2006.01) |
| *B01J 23/42* | (2006.01) |
| *B01J 23/44* | (2006.01) |
| *B01J 23/56* | (2006.01) |
| *B01J 21/04* | (2006.01) |
| *B01J 23/63* | (2006.01) |
| *F01N 3/035* | (2006.01) |
| *F01N 3/28* | (2006.01) |
| *B01J 35/00* | (2006.01) |
| *B01J 23/46* | (2006.01) |
| *B01J 35/10* | (2006.01) |
| *B01D 53/94* | (2006.01) |
| *B01J 37/04* | (2006.01) |
| *B01J 29/068* | (2006.01) |
| *B01J 35/04* | (2006.01) |
| *F01N 3/10* | (2006.01) |
| *F01N 3/023* | (2006.01) |

(52) U.S. Cl.
    CPC ............ *B01J 23/464* (2013.01); *B01J 29/068* (2013.01); *B01J 35/002* (2013.01); *B01J 35/0006* (2013.01); *B01J 35/04* (2013.01); *B01J 35/1061* (2013.01); *B01J 35/1066* (2013.01); *B01J 37/04* (2013.01); *F01N 3/023* (2013.01); *F01N 3/035* (2013.01); *F01N 3/10* (2013.01); *F01N 3/2803* (2013.01); *B01D 53/9477* (2013.01); *B01D 2255/1021* (2013.01); *B01D 2255/1025* (2013.01); *B01D 2255/2063* (2013.01); *B01D 2255/2065* (2013.01); *B01D 2255/2066* (2013.01); *B01D 2255/2068* (2013.01); *B01D 2255/2092* (2013.01); *B01D 2255/20715* (2013.01); *B01D 2255/40* (2013.01); *B01D 2255/908* (2013.01); *B01D 2258/012* (2013.01); *B01J 2523/00* (2013.01); *F01N 2330/00* (2013.01)

(58) Field of Classification Search
    USPC ..... 502/302–304, 327, 332, 333, 339, 349, 502/355, 439
    See application file for complete search history.

(56) References Cited

U.S. PATENT DOCUMENTS

| | | | | |
|---|---|---|---|---|
| 7,119,046 | B2* | 10/2006 | Ohno | B01D 53/945 502/178 |
| 8,455,390 | B2* | 6/2013 | Kikuchi | B01D 53/945 502/240 |
| 8,544,261 | B2* | 10/2013 | Mori | B01D 53/944 502/304 |
| 8,709,365 | B2* | 4/2014 | Dornhaus | B01D 53/944 422/177 |
| 8,858,904 | B2* | 10/2014 | Punke | B01J 35/0006 422/177 |
| 2007/0196245 | A1* | 8/2007 | Fujita | B01D 53/944 422/177 |
| 2008/0127638 | A1 | 6/2008 | Vaarkamp et al. | |
| 2008/0141661 | A1 | 6/2008 | Voss et al. | |
| 2009/0041637 | A1 | 2/2009 | Harada et al. | |
| 2009/0298673 | A1* | 12/2009 | Akamine | B01J 21/066 502/65 |
| 2011/0014099 | A1* | 1/2011 | Dornhaus | B01D 53/944 423/213.5 |
| 2011/0030346 | A1* | 2/2011 | Neubauer | B01D 53/944 60/274 |
| 2013/0336864 | A1* | 12/2013 | Zheng | B01J 23/63 423/213.5 |
| 2014/0266214 | A1* | 9/2014 | Alumbaugh | G01V 3/26 324/355 |

FOREIGN PATENT DOCUMENTS

| | | |
|---|---|---|
| JP | 2009-039632 A | 2/2009 |
| JP | 2010-511829 A | 4/2010 |
| JP | 2013-031849 A | 2/2013 |
| JP | 2013-092090 A | 5/2013 |
| JP | 2013-141650 A | 7/2013 |

OTHER PUBLICATIONS

Written Opinion issued in PCT/JP2014/003808; mailed Sep. 9, 2014.

* cited by examiner

ETHANOLAMINE Pt

Pt-P SALT

EXHAUST GAS PURIFICATION CATALYST AND METHOD FOR MANUFACTURING SAME

TECHNICAL FIELD

The present invention relates to an exhaust gas purification catalyst and a method of making the same.

BACKGROUND ART

In an exhaust gas channel of a vehicle equipped with a lean-combustion engine such as a diesel engine or any other engine, a particulate filter is provided to collect particulate matter (PM such as carbonaceous particulates and other particulates) in an exhaust gas. This filter may be clogged if a large amount of PM is accumulated thereon. Thus, the amount of PM accumulated is estimated based on a difference between the pressures sensed by pressure sensors arranged in front of, and behind, the filter. When the amount of PM accumulated reaches a predetermined value, the temperature of the exhaust gas that reaches the filter is raised by controlling fuel injection of the engine (e.g., increasing the fuel or performing after injection) so as to burn the PM off. In order to burn the PM off efficiently, a diesel oxidation catalyst (DOC) is provided in the exhaust gas channel upstream of the filter, and a catalyst is loaded on walls of exhaust gas passages in the filter.

Specifically, the DOC is provided mainly for the purpose of increasing the temperature of the exhaust gas that flows into the filter to such a degree that the PM catches fire. The DOC allows for oxidizing and burning unburned HC and CO contained in the exhaust gas when the after injection is performed, and the heat generated by this reaction increases the temperature of the exhaust gas flowing through the filter. On the other hand, the catalyst provided on the walls of the exhaust gas passages in the particulate filter allows the PM accumulated on pores in the cell walls of the filter to catch fire more easily (i.e., reduces the temperature at which the PM catches fire), or ensures continuous burning of the PM so as to reduce the amount of PM released in the air, and shorten the time for regenerating the filter. This thus allows for reducing the amount of fuel injected for the regeneration. That is, this contributes to reducing a deterioration in fuel efficiency.

Such a DOC is proposed by, for example, Patent Document 1. Patent Document 1 discloses a configuration in which a catalytic material, containing an inorganic oxide selected from the group consisting of alumina, silica, titania, zirconia, ceria, and zeolite and a catalytic metal loaded on the inorganic oxide and selected from the group consisting of Pt, Pd, Rh, Ag, Au and Ir, is provided on a substrate of a wall-flow filter having gas distribution cells.

On the other hand, Patent Document 2 proposes a catalyst-loaded particulate filter in which a catalyst is provided on the walls of the exhaust gas passages in the filter as described above. Patent Document 2 discloses a catalyst-loaded particulate filter in which a catalytic layer, containing a Ce-containing composite oxide, a Ce-free, Zr-containing composite oxide, an activated alumina, and a catalytic metal, is provided on the walls of the exhaust gas passages in a filter for collecting particulates in the exhaust gas. According to Patent Document 2, Pt is loaded on the activated alumina.

CITATION LIST

Patent Documents

[Patent Document 1] Japanese Unexamined Patent Publication No. 2013-031849
[Patent Document 2] Japanese Unexamined Patent Publication No. 2009-039632

SUMMARY OF THE INVENTION

Technical Problem

Patent Documents 1 and 2 do not specifically provide the details of the alumina contained as a catalytic component. However, in recent years, the exhaust gas purification catalysts are required to have resistance to heat. Thus, in general, a La-containing alumina which contains about 3-5 mass % of La on an oxide basis and has high resistance to heat is used. Further, it has been known that a Pt-loaded alumina, which is an alumina on which Pt as a catalytic metal is loaded, has the function of oxidizing NO into $NO_2$ in an oxidation catalyst or a lean $NO_x$ trapping catalyst, and that $NO_2$ is effective in burning the PM. Thus, it can be said that it is effective to have the Pt-loaded alumina loaded on the oxidation catalyst such as a DOC or a particulate filter.

Considering its crystal structure, the La-containing alumina is classified into a γ-alumina which has a specific surface area large enough to advantageously load a catalytic metal thereon and which is suitably used as a catalytic material. However, the La-containing alumina has a property of being bulky. Thus, if the content of the La-containing alumina as the catalytic component is increased and the amount of Pt loaded on the alumina is increased to burn the PM much more satisfactorily, the pores in the filter functioning as the exhaust gas passages become narrower. This may easily increase a back pressure of the engine or cause the clogging of the filter. The increased back pressure deteriorates the combustibility of the engine, and the clogging of the filter increases the frequency of filter regeneration, both of which result in deterioration of fuel efficiency. Such an increase in back pressure occurs not only in a filter-shaped substrate, but also in a common honeycomb substrate.

If the La-containing alumina only is used as an alumina material and is turned into slurry to be applied onto a substrate, the viscosity of the slurry increases as the content of the La-containing alumina increases, which makes it less easy to apply the slurry onto the substrate. In order to apply the slurry without increasing its viscosity, the application needs to be performed separately several times, which increases the manufacturing cost. Thus, it is difficult to increase the content of the Pt-loaded alumina to improve PM burning performance.

In view of the foregoing, it is therefore an object of the present invention to provide an exhaust gas purification catalyst which allows for improving the PM burning performance, reducing an increase in the back pressure, preventing the filter from clogging so frequently, and minimizing a decrease in fuel efficiency.

Solution to the Problem

To achieve this object, the present invention provides an exhaust gas purification catalyst containing multiple types of γ-aluminas on each of which Pt is loaded.

Specifically, the exhaust gas purification catalyst of the present invention is disposed in an exhaust gas channel of an engine and includes a catalytic layer provided on a substrate. The catalytic layer contains multiple types of γ-aluminas which are different in composition and Pt loaded on the multiple types of γ-aluminas.

In the exhaust gas purification catalyst according to the present invention, the Pt-loaded γ-aluminas suitably used as a catalytic material are used as materials for the catalytic layer as described above. This allows for oxidizing NO in the exhaust gas into $NO_2$ with high efficiency. As described above, $NO_2$ contributes to the acceleration of the burning of the PM, and thus the catalyst of the present invention capable of producing a large amount of $NO_2$ through an oxidation reaction allows for accelerating the burning of the PM. Further, not only bulky alumina such as a La-containing alumina but also other types of aluminas are used. That is, multiple types of aluminas are used, which allows for reducing the bulkiness of the aluminas even if the total amount of aluminas used is increased. This allows for preventing the pores in the substrate on which the catalytic layer is provided from clogging frequently and reducing an increase in a back pressure. Further, if the multiple types of aluminas are used when the slurry of the catalytic material is applied onto the substrate, an increase in the volume of the entire catalytic material may be reduced, and an increase in the viscosity of the slurry may be reduced, thereby facilitating the application of the catalytic material slurry to the substrate. This allows for increasing the amount of the Pt-loaded alumina contributing to the generation of $NO_2$ which accelerates the burning of the PM.

In the exhaust gas purification catalyst according to the present invention, the multiple types of γ-aluminas preferably include a first alumina containing no additives and a second alumina containing La as an additive.

As described above, the second alumina containing La has high resistance to heat and is bulky. Using the first alumina containing no additives together with the second alumina allows for reducing the total volume of the catalytic material without sacrificing the heat resistance of the catalytic material significantly. This allows for preventing the pores in the substrate from becoming too narrow, preventing the pores in the substrate from clogging so frequently, and reducing an increase in back pressure. Further, as the alumina materials, the first alumina that is a pure alumina is used in addition to the second alumina that is a La-containing alumina, and thus the viscosity of the catalytic material slurry does not increase too much even if the content of aluminas is increased, thereby facilitating the application of the slurry to the substrate. This allows for increasing the amount of Pt-loaded alumina in the slurry, thereby accelerating the oxidation of NO into $NO_2$ which contributes to the burning of the PM, and improving the PM burning efficiency.

In the exhaust gas purification catalyst according to the present invention, it is preferable to dispose the catalytic layer on a honeycomb substrate for a diesel oxidation catalyst arranged upstream of a particulate filter, or on a particulate filter so as to improve the PM burning efficiency as described above.

If the substrate is the particulate filter, the catalytic layer preferably contains multiple types of γ-aluminas which are different in composition, Pt loaded on the multiple types of γ-aluminas, a composite oxide which releases active oxygen, and Pt loaded on the composite oxide.

Use of the multiple types of γ-aluminas which are different in composition allows for preventing the filter from clogging so frequently, and reducing an increase in the back pressure. As a result, the frequency of filter regeneration is reducible, thereby allowing for reducing a deterioration in fuel efficiency. Further, since the catalytic layer contains the composite oxide which releases active oxygen, the PM accumulated on the filter is oxidized and burned by the catalyst while the PM is in contact with the catalyst. Even when the PM comes out of contact with the catalyst, the composite oxide supplies active oxygen to the PM, thereby allowing for burning the PM continuously for an extended period of time.

If the substrate is the particulate filter, the multiple types of γ-aluminas preferably include a first alumina containing no additives and a second alumina containing La.

As described above, the second alumina containing La has high resistance to heat and is bulky. Using the first alumina containing no additives together with the second alumina allows for reducing the total volume of the catalytic material without sacrificing the heat resistance of the catalytic material significantly. This allows for preventing the pores in the filter from becoming too narrow, preventing the filter from clogging so frequently, and reducing an increase in the back pressure. As a result, the frequency of filter regeneration is reducible, thereby allowing for reducing a deterioration in fuel efficiency.

If the substrate is the particulate filter, the composite oxide preferably includes a Zr-based composite oxide free from Ce and containing Zr and a CeZr-based composite oxide containing Ce and Zr.

It is presumed that the Zr-based composite oxide has oxygen exchange ability and high oxide ion conductivity, and thus is able to release a large amount of active oxygen which acts effectively on the burning of the PM. Thus, if Pt is loaded on the Zr-containing composite oxide, an oxygen exchange reaction is accelerated via Pt, and thus the Zr-containing composite oxide may exhibit excellent PM burning performance. Further, it is presumed that the CeZr-containing composite oxide has high oxygen storing/releasing capacity and is able to release oxygen having high reaction activity. Thus, even if oxygen is consumed locally at a portion of the catalyst where the PM is burned, the ZrCe-based composite oxide supplies oxygen immediately to allow the PM to burn continuously.

In this case, the Zr-based composite oxide is preferably a ZrNdPr-containing composite oxide having an average pore diameter of 20 nm to 60 nm.

In such an embodiment, the Zr-based composite oxide has a relatively large pore diameter, which allows for frequent contact between the Zr-based composite oxide and the exhaust gas, thereby increasing the amount of active oxygen generated.

A total amount of Pt loaded on each of the multiple types of γ-aluminas is preferably larger than a total amount of Pt loaded on the composite oxide in order to disperse Pt widely, to generate a larger amount of $NO_2$, and thus to improve the PM burning performance.

A method of making an exhaust gas purification catalyst according to the present invention is designed to make an exhaust gas purification catalyst disposed in an exhaust gas channel of an engine and including a catalytic layer provided on a substrate. The method includes: mixing together multiple types of γ-aluminas which are different in composition and loading Pt on a mixture thus obtained; and applying the Pt-loaded mixture of the multiple types of γ-aluminas to the substrate.

The method of making the exhaust gas purification catalyst of the present invention provides an exhaust gas purification catalyst which allows for improving the ability of oxidizing NO into $NO_2$, burning the PM continuously for an extended period of time, preventing the frequent clogging of the filter, and reducing an increase in back pressure which is involved with such clogging. In the process step of applying the mixture of the multiple types of γ-aluminas to the substrate, the viscosity of the mixture is adjusted easily to a predetermined viscosity by using the multiple types of γ-aluminas. This allows for increasing the amount of Pt-loaded alumina which contributes to the burning of the PM without worrying about a decrease in the applicability due to the increased viscosity.

If the substrate is the particulate filter, a preferred method of making an exhaust gas purification catalyst includes: providing a particulate filter as the substrate; mixing together multiple types of γ-aluminas which are different in composition and loading Pt on a mixture thus obtained; loading Pt on a composite oxide which releases active oxygen; and mixing the Pt-loaded mixture of the multiple types of γ-aluminas and the Pt-loaded composite oxide to obtain a mixture; and applying the obtained mixture onto walls of exhaust gas passages in the filter.

This method provides a catalyst-loaded particulate filter in which the ability of oxidizing NO into $NO_2$ is readily improved by the Pt-loaded multiple types of γ-aluminas, the PM is burned continuously for an extended period of time in the presence of active oxygen released by the composite oxide, and the frequent clogging of the filter and a resultant significant increase in back pressure are readily prevented to reduce a deterioration in fuel efficiency.

In the method of making the exhaust gas purification catalyst according to the present invention, ethanolamine Pt (a hexahydroxy platinic (IV) acid-ethanolamine solution) is preferably used as a Pt material to be loaded on the mixture of the multiple types of γ-aluminas or the composite oxide.

Ethanolamine Pt is a complex of ethanolamine and Pt. While a Pt material (Pt—P salt) has square planar molecular geometry in which nitro groups and amine groups are coordinated to a Pt atom, ethanolamine Pt has octahedral molecular geometry in which hydroxyl groups are coordinated to a Pt atom. In addition, since ethanolamine ($NH_3C_2H_5OH$) is present around the Pt-hydroxyl group complex, the complex itself is large in size. Thus, if ethanolamine Pt is used, most of the complexes do not enter the pores of the γ-alumina or the composite oxide, but are loaded on the surfaces of the γ-alumina or the composite oxide. That is, many Pt particles may be arranged on the surface of the catalytic material. This allows for increasing the ratio of contact between Pt and the exhaust gas, improving the efficiency of oxidation of NO in the exhaust gas by Pt, and producing a larger amount of $NO_2$. As a result, the PM burning efficiency is improvable.

Advantages of the Invention

An exhaust gas purification catalyst and method of making the same according to the present invention provides an exhaust gas purification catalyst which allows for oxidizing NO into $NO_2$ with high efficiency to improve the PM burning performance, and preventing the frequent clogging of the filter and the resultant significant increase in back pressure to reduce a deterioration in fuel efficiency.

DESCRIPTION OF EMBODIMENTS

Embodiments of the present invention will be described below with reference to the drawings. The preferred embodiments to be described below are merely illustrative ones in nature, and do not intend to limit the scope of the present invention or applications or uses thereof.

<On Combustion of PM>

Figure 1:
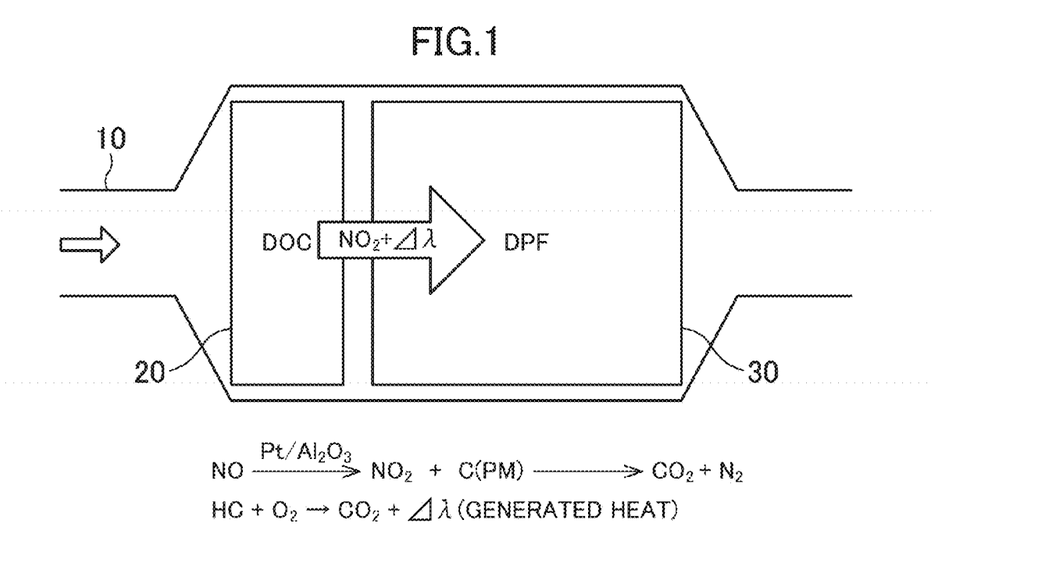
FIG. 1 is a schematic view illustrating an oxidation catalyst and a particulate filter arranged in an exhaust gas channel of an engine.

A mechanism for collecting and burning PM in an exhaust gas will be described first. FIG. 1 illustrates a diesel oxidation catalyst (DOC) 20 and a diesel particulate filter (DPF) 30 which are disposed in an exhaust gas channel 10 of a diesel engine. The DOC 20 includes, for example, a catalytic layer formed on a honeycomb substrate, and an activated alumina and Pt loaded on the activated alumina are contained in the catalytic layer. Further, a catalyst for oxidizing and burning the PM is also provided on wall surfaces of exhaust gas passages in the DPF 30.

The DOC 20 oxidizes NO into $NO_2$ and HC into $H_2O$ and $CO_2$, respectively, in the exhaust gas to generate reaction heat as represented by the reaction formula shown in FIG. 1. The $NO_2$ and reaction heat thus generated allow for burning the PM accumulated on the DPF 30 efficiently. The catalyst provided on the wall surfaces of the exhaust gas passages in the DPF 30 contributes to lowering the ignition temperature of the PM accumulated in pores in the cell walls of the filter, thereby improving PM burning efficiency.

<On DOC>

A configuration of the DOC 20 according to an embodiment of the present invention will be described with reference to FIG. 2 and other drawings.

[On Catalytic Layer]

Figure 2:
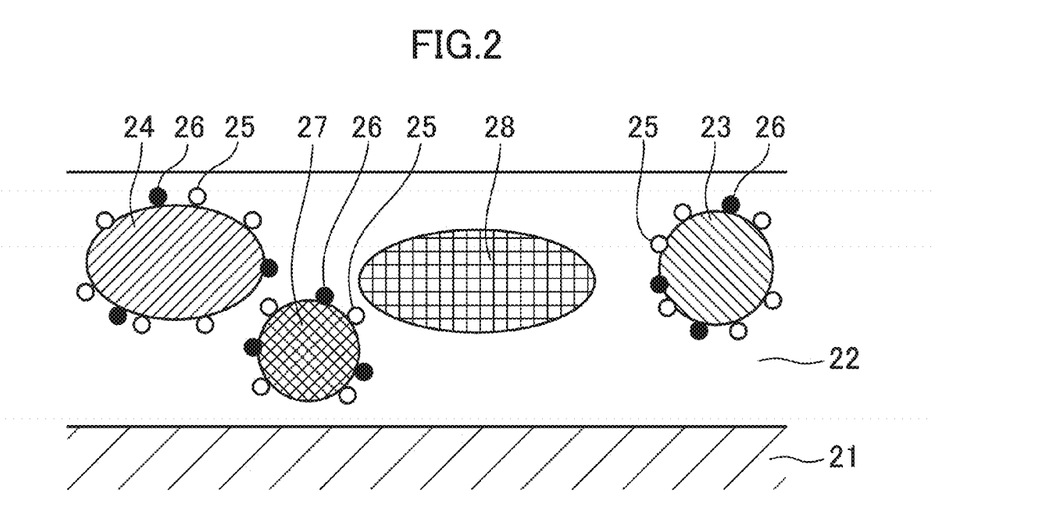
FIG. 2 is a cross-sectional view schematically illustrating the configuration of a catalytic layer formed on a honeycomb substrate.

As shown in FIG. 2, a catalytic layer 22 is formed on a honeycomb substrate 21 of the DOC 20. This catalytic layer 22 contains multiple types of activated aluminas. In this embodiment, the multiple types of activated aluminas include two types of activated aluminas, both of which contain γ-alumina as a main component, one of which is a pure alumina (a first alumina) 23 containing no additives, and the other of which is a La-containing alumina (a second alumina) 24 containing about 4 mass % of La as an additive. Pt 25, which is a catalytic metal, is loaded on each of the pure alumina 23 and the La-containing alumina 24. The catalytic metal is not necessarily Pt, but may be any other catalytic metal such as Pd 26. In this embodiment, the catalytic layer 22 contains Pt-loaded alumina, and thus allows for oxidation of NO into $NO_2$ with high efficiency, and for burning the PM continuously for an extended period of time. Further, in this embodiment, the pure alumina is used as the activated alumina in addition to the bulky La-containing alumina. Thus, as compared with the case where only the La-containing alumina is used, the total volume of the catalyst layer is reducible, thus preventing the frequent clogging of the exhaust gas passages of the substrate and other inconveniences.

In this embodiment, the catalytic layer 22 may contain, in addition to the multiple types of activated aluminas, a CeZr-based composite oxide 27 containing Ce and Zr and zeolite 28. In this embodiment, the CeZr-based composite oxide 27 is a Rh-doped CeZrNd composite oxide (Rh-doped $CeZrNdO_x$) in which Rh is contained as solid solution in a CeZrNd composite oxide, and the zeolite 28 is a β-zeolite. Pt 25 is also loaded on the CeZr-based composite oxide 27. The CeZr-based composite oxide 27 has high oxygen storing/releasing capacity, and thus improves oxidation performance of the catalytic layer. Further, the zeolite 28 functions as an HC trapping material and is involved in purification of HC in the exhaust gas. Pd 26 may also be loaded on the CeZr-based composite oxide 27.

In a preferred embodiment, the total amount of the multiple types of activated aluminas loaded is 48 g/L to 72 g/L, the amount of the CeZr-based composite oxide loaded is 32 g/L to 48 g/L, and the amount of the zeolite loaded is 80 g/L to 120 g/L. Note that the amount of a material loaded is the amount (g) of the material loaded per L of the substrate (the same goes for the rest of the description). If the pure alumina and the La-containing alumina are used as the multiple types of activated aluminas, the pure alumina and the La-containing alumina are preferably used at a mass ratio of the pure alumina/the La-containing alumina=1/8 to 4/1. The total amount of Pt loaded on the mixture of the multiple types of activated aluminas is preferably 0.1 g/L to 10 g/L. The amount of Pt loaded on the CeZr-based composite oxide is preferably 0.01 g/L to 5 g/L.

[Method of Making DOC]

A method of making the DOC 20 will be described below.

The activated aluminas used such as the La-containing alumina and the pure alumina may be commercially available powders. The Rh-doped CeZrNd composite oxide as the CeZr-based composite oxide may be obtained by the following preparation method.

First, cerium (III) nitrate hexahydrate, a zirconium oxynitrate solution, neodymium nitrate hexahydrate, and a rhodium nitrate solution are dissolved in ion exchanged water. An 8-fold dilution of 28 mass % ammonia water is mixed with this nitrate solution to neutralize the solution, thereby obtaining a coprecipitate. Then, this coprecipitate is dehydrated by centrifuging the solution containing the coprecipitate using a centrifugal separator to remove a supernatant, and washed with water by stirring the solution with ion exchanged water added thereto alternately and repeatedly a required number of times. Thereafter, the coprecipitate obtained after the final dehydration is left in the air, dried at about 150° C. for 24 hours, and then pulverized to a mean particle size of about 100 nm using a ball mill. Then, the obtained particles are baked in the air at 500° C. for 2 hours to obtain Rh-doped CeZrNd composite oxide particles.

A method for loading Pt on the Rh-doped CeZrNd composite oxide particles will be described below.

First, ion exchanged water is added to the Rh-doped CeZrNd composite oxide particles to prepare slurry, which is then stirred sufficiently with a stirrer or any other suitable tool. Then, while stirring the slurry, a predetermined amount of ethanolamine Pt is dripped to the slurry, and the mixture is stirred sufficiently. Thereafter, the product thus obtained is further stirred under heat to completely vaporize the water. After the evaporation, the product thus obtained is baked in the air at 500° C. for 2 hours to load Pt on each of the composite oxide particles.

Then, a method for loading Pt on activated aluminas will be described below.

As the activated aluminas, pure alumina particles and La-containing alumina particles containing 4 mass % of La, both of which are commercially available, may be used. These particles are mixed and ion exchange water is added thereto to prepare slurry, which is then stirred sufficiently with a stirrer or any other suitable tool. Then, a predetermined amount of ethanolamine Pt is dripped to the slurry being stirred, and the mixture thus obtained is stirred sufficiently. Thereafter, the product thus obtained is further stirred under heat to completely vaporize the water. After the evaporation, the product thus obtained is baked in the air at 500° C. for 2 hours to load Pt on each of the alumina particles.

The Pt-loaded Rh-doped CeZrNd composite oxide particles and the Pt-loaded alumina particles obtained in the above-described manner are mixed, and ion exchanged water and a binder are added to the mixture to obtain slurry. The slurry is applied onto a honeycomb substrate, dried, and then baked at 500° C. for 2 hours to obtain an exhaust gas purification catalyst. Optionally, the slurry thus prepared may be applied onto wall surfaces of exhaust gas passages in a particulate filter to obtain a catalyst-loaded particulate filter.

Figure 3:
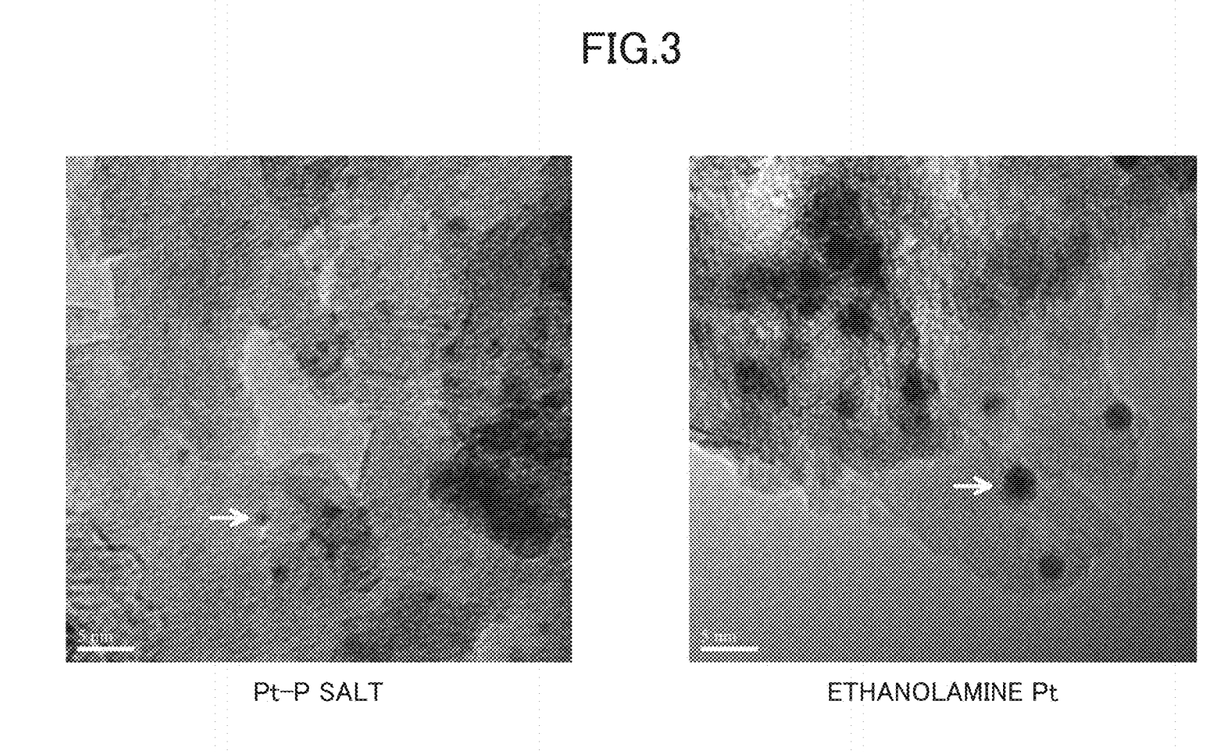
FIG. 3 shows photographs of a La-containing alumina on which Pt was loaded using Pt—P salt and a La-containing alumina on which Pt was loaded using ethanolamine Pt, both of which were shot through a transmission electron microscope (TEM).

In this embodiment, Pt is loaded on an alumina material. As described above, ethanolamine Pt is preferably used as a Pt material. FIG. 3 shows photographs of a La-containing alumina on which Pt was loaded using Pt—P salt (a dinitro diamine palladium nitrate solution) as the Pt material and a La-containing alumina on which Pt was loaded using ethanolamine Pt as the Pt material, both of which were shot through a transmission electron microscope (TEM). As shown in FIG. 3, when the Pt—P salt was used, Pt particles obtained after the baking had a diameter of as small as about 1 nm, and were dispersed widely over the surface and in the pores of the alumina material (see the photograph on the left). Since a complex of ethanolamine Pt is larger than that of the Pt—P salt, the ratio of the Pt particles entering the pores of the alumina material decreased, and the ratio of the Pt particles loaded on the surface of the alumina material increased. As a result, the Pt particles obtained after the baking had a diameter of about 4 nm, which was larger than that of the Pt—P salt, and had a higher density (see the photograph on the right). Thus, in the catalyst-loaded particulate filter, the ratio of contact between the PM and Pt increases. Further, in the DOC, the frequency of contact between NO in the exhaust gas and Pt increases to facilitate the generation of $NO_2$, thereby allowing for burning satisfactorily the PM accumulated on the particulate filter arranged downstream of the DOC. For these reasons, ethanolamine Pt is preferably used as the Pt material.

Examples

Examples will be provided below to describe the exhaust gas purification catalyst of the present invention in detail. In the following examples, light-off temperatures (T25 (° C.)) and $NO_x$ purification rates (C300(%) and C400(%)) related to the purification of $NO_x$ by exhaust gas purification catalysts having catalytic layers of the following compositions were studied.

Figure 4:
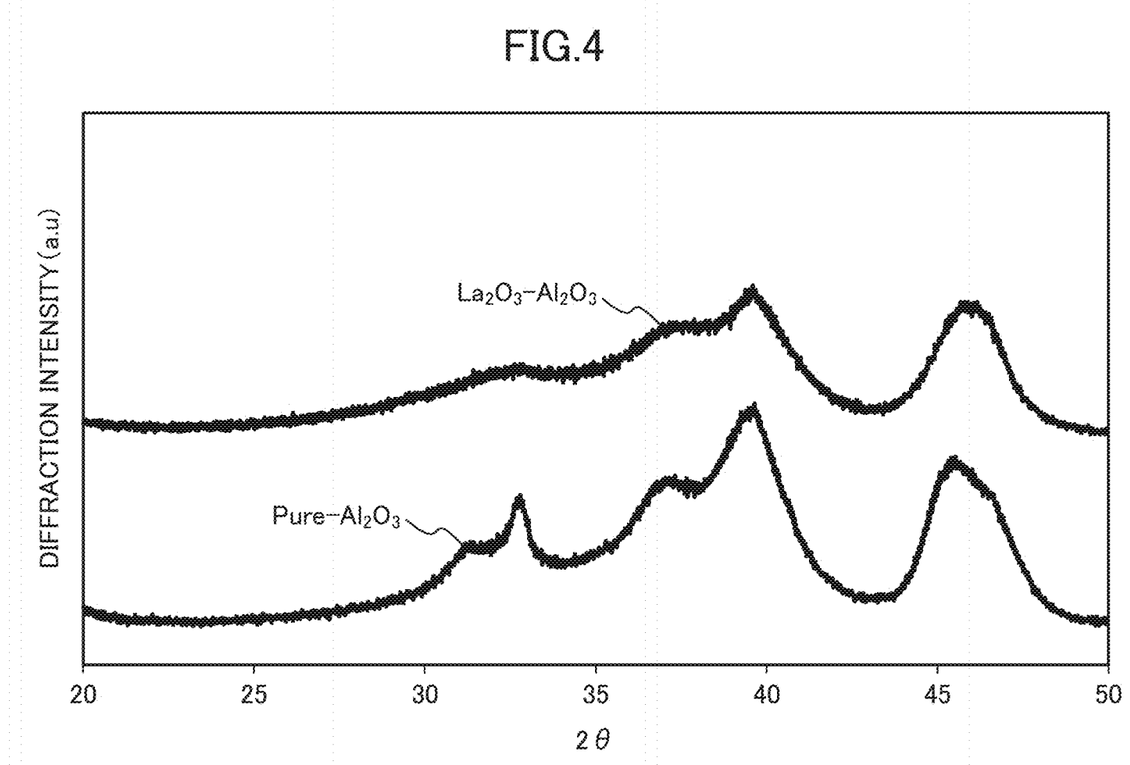
FIG. 4 is a graph showing X-ray diffraction spectra of a La-containing alumina and a pure alumina.
Figure 5:
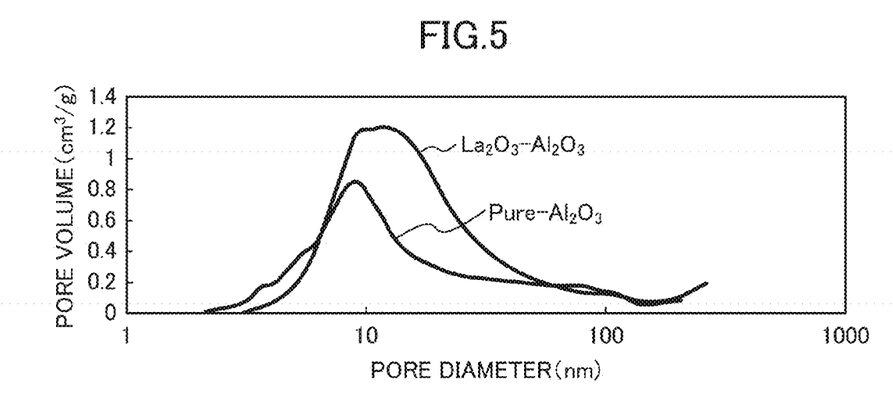
FIG. 5 is a graph showing pore size distributions of a La-containing alumina and a pure alumina.

In each of the following examples, a catalytic material containing a Pt-loaded pure alumina, a Pt-loaded La-containing alumina, Pt-loaded Rh-doped $CeZrNdO_x$ and a zeolite was prepared and used in the above-described manner. The pure alumina and the La-containing alumina containing 4 mass % of La were made by Rhodia, and turned out to have the spectra shown in FIG. 4, respectively, as a result of X-ray diffraction (X-ray source: CuKα ray). As shown in FIG. 4, the La-containing alumina had a broad peak, which indicates that the La-containing alumina was a γ-alumina. The pure alumina also had a peak close to that of the La-containing alumina, which indicates that a main component of the pure alumina was a γ-alumina. FIG. 5 shows the results of measurement of pore size distributions of the pure alumina and the La-containing alumina (in which micrometrics TriStar 3000 produced by SIMADZU Corporation was used). As shown in FIG. 5, the pure alumina had a peak at a pore diameter of around 10 nm. On the other hand, the La-containing alumina had a broad peak in a range of a pore diameter of around 10 nm to a pore diameter of greater than 10 nm, which indicates that many of the La-containing alumina particles had a pore diameter of 10 nm or more. The pure alumina had an average pore diameter of 10.07 nm and a pore volume of 0.537 cm$^3$/g, while the La-containing alumina had an average pore diameter of 13.15 nm and a pore volume of 0.822 cm$^3$/g. The La-containing alumina had a greater pore volume than the pure alumina, which indicates that the La-containing alumina was bulky.

The catalysts of Examples 1-6 contained the Pt-loaded pure alumina, the Pt-loaded La-containing alumina, the Pt-loaded Rh-doped $CeZrNdO_x$, and the zeolite, as described above, at a composition ratio of alumina:zeolite:Rh-doped $CeZrNdO_x$=3:5:2 (by weight). The composition of the Rh-doped CeZrNd composite oxide was $Rh:CeO_2:ZrO_2:Nd_2O_3$=0.1:28:62:10 (by weight). The catalytic layers of Examples 1-6 contained the pure alumina and the La-containing alumina in mutually different ratios. Comparative Example 1 was different from Examples 1-6 in that the catalytic layer of Comparative Example 1 contained no pure alumina as the alumina, and contained only the La-containing alumina. In Examples 1-6 and Comparative Example 1, 0.5 g/L in total of Pt was loaded on the activated aluminas, and 0.1 g/L of Pt was loaded on the Rh-doped CeZrNd composite oxide. The following Table 1 shows the amounts of the pure alumina (Pure-$Al_2O_3$) and La-containing alumina ($La_2O_3$—$Al_2O_3$) contained in the catalysts of Examples 1-6 and Comparative Example 1. As the Pt material, Pt—P salt was used in Comparative Example 1, while ethanolamine Pt was used in Examples 1-6.

TABLE 1

| | $Al_2O_3$ | g/L | $Al_2O_3$ ratio |
|---|---|---|---|
| Example 1 | Total | 20 | $La_2O_3$—$Al_2O_3$:Pure-$Al_2O_3$ = 8:1 |
| | $La_2O_3$—$Al_2O_3$ | 17.78 | |
| | Pure-$Al_2O_3$ | 2.22 | |
| Example 2 | Total | 20 | $La_2O_3$—$Al_2O_3$:Pure-$Al_2O_3$ = 4:1 |
| | $La_2O_3$—$Al_2O_3$ | 16 | |
| | Pure-$Al_2O_3$ | 4 | |
| Example 3 | Total | 20 | $La_2O_3$—$Al_2O_3$:Pure-$Al_2O_3$ = 2:1 |
| | $La_2O_3$—$Al_2O_3$ | 13.33 | |
| | Pure-$Al_2O_3$ | 6.67 | |
| Example 4 | Total | 20 | $La_2O_3$—$Al_2O_3$:Pure-$Al_2O_3$ = 1:1 |
| | $La_2O_3$—$Al_2O_3$ | 10 | |
| | Pure-$Al_2O_3$ | 10 | |
| Example 5 | Total | 20 | $La_2O_3$—$Al_2O_3$:Pure-$Al_2O_3$ = 1:2 |
| | $La_2O_3$—$Al_2O_3$ | 6.67 | |
| | Pure-$Al_2O_3$ | 13.33 | |
| Example 6 | Total | 20 | $La_2O_3$—$Al_2O_3$:Pure-$Al_2O_3$ = 1:4 |
| | $La_2O_3$—$Al_2O_3$ | 4 | |
| | Pure-$Al_2O_3$ | 16 | |
| Comparative Example 1 | Total | 20 | $La_2O_3$—$Al_2O_3$ only |
| | $La_2O_3$—$Al_2O_3$ | 20 | |
| | Pure-$Al_2O_3$ | 0 | |

In each of Examples and Comparative Example, the catalytic material was turned into slurry in the above-described manner, which was then applied to a DOC substrate made of cordierite (volume: 25 mL, cell wall thickness: 4 mil, number of cells: 400 cpsi) to obtain a sample filter having a catalytic layer. In each of Examples and Comparative Example, the amount of wash coat was 200 g/L.

Light-off temperatures (T25 (° C.)) and $NO_x$ purification rates (C300(%) and C400(%)) related to purification of $NO_x$ which were measured on the sample filters of Examples and Comparative Example thus obtained will be described below.

First, as a pretreatment, each of the sample filters was loaded into a model gas flow reactor, a model gas (200 ppmC of $C_3H_6$, 400 ppm of CO, 500 ppm of NO, 10% of O2, 10% of $H_2O$, 4.5% of $CO_2$ and $N_2$ as the balance) was introduced in the reactor (at a rate of 40 L/min), and the temperature of the model gas was raised to 400° C. at a rate of 30° C./min. Then, the temperature was allowed to fall to room temperature while keeping the gas composition unchanged.

Figure 6:
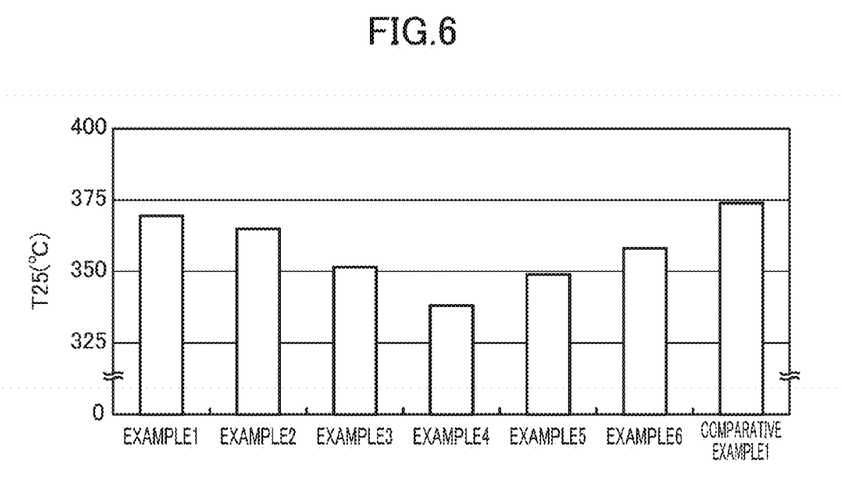
FIG. 6 is a graph showing a light-off temperature (T25) related to purification of $NO_x$ by exhaust gas purification catalysts of Examples 1-6 and Comparative Example 1.
Figure 7:
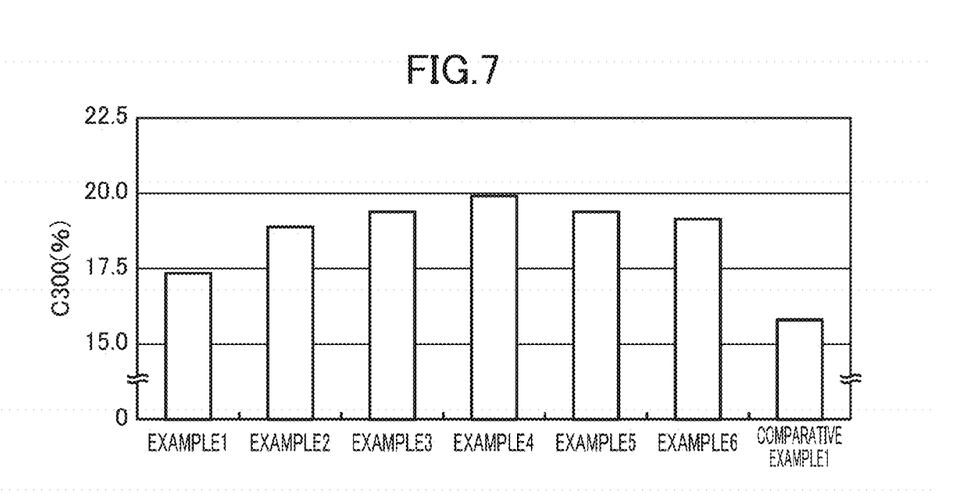
FIG. 7 is a graph showing steady-state $NO_x$ purification performance (C300) of the exhaust gas purification catalysts of Examples 1-6 and Comparative Example 1.
Figure 8:
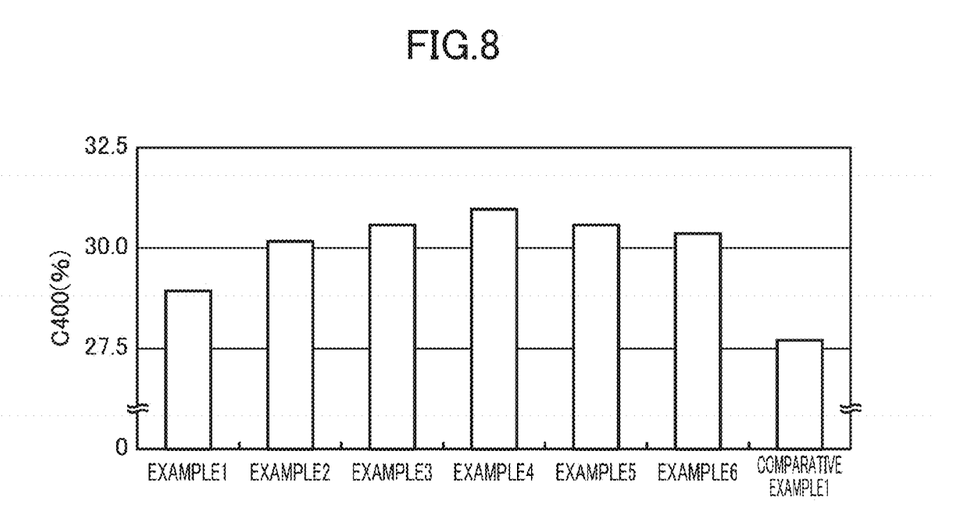
FIG. 8 is a graph showing steady-state $NO_x$ purification performance (C400) of the exhaust gas purification catalysts of Examples 1-6 and Comparative Example 1.

Then, while introducing the model gas (200 ppmC of $C_3H_6$, 400 ppm of CO, 500 ppm of NO, 10% of O2, 10% of $H_2O$, 4.5% of $CO_2$ and $N_2$ as the balance) again at a rate of 40 L/min, a NO concentration was measured when the temperature was raised to 400° C. at a rate of 30° C./min to obtain T25, C300, and C400. While increasing the temperature of the model exhaust gas flowing into the catalyst gradually from room temperature, variation in $NO_x$ concentration in the gas flowing out of the catalyst was detected, and a gas temperature at a catalyst inlet was measured as T25 (° C.) when a $NO_x$ purification rate reached 25%. C300(%) represents a $NO_x$ purification rate obtained when the model exhaust gas temperature at the catalyst inlet was 300° C., and C400(%) represents a $NO_x$ purification rate obtained when the model exhaust gas temperature at the catalyst inlet was 400° C. FIGS. 6-8 show the results.

Compared with Comparative Example 1 in terms of T25, Examples 1-6 had lower T25 than Comparative Example 1 as shown in FIG. 6. On the other hand, compared with Comparative Example 1 in terms of C300 and C400, Examples 1-6 had higher C300 and C400 than Comparative Example 1 as shown in FIGS. 7 and 8. These results suggest that using both of the La-containing alumina and the pure alumina as the alumina material would improve $NO_x$ oxidation performance. These results were obtained probably for the following reason. Specifically, since the La-containing alumina has a larger pore diameter than the pure alumina as can be seen from the pore size distributions shown in FIG. 5, a larger amount of Pt would have entered the pores of the La-containing alumina, while the pure alumina would have allowed most of its Pt particles to stay on its surface, unlike the La-containing alumina. This suggests that the amount of Pt that comes into contact with the exhaust gas would have increased so much as to promote the oxidation of $NO_x$. Further, it is considered that when both of the La-containing alumina and the pure alumina were used, the volume of the catalytic material would not have increased significantly, the filter would not have been clogged frequently, the gas would have diffused satisfactorily, and the efficiency of NO oxidation by Pt-loaded alumina would have been improved by the Pt-loaded aluminas. In addition, the La-containing alumina, which is basic, has lower Pt absorptivity than the pure alumina which is amphoteric and has an acid point. Thus, the catalysts of Examples 1-6 containing the pure alumina having high Pt absorptivity exhibited better NO oxidation performance probably for that reason.

Comparing the results obtained in Examples 1-6 with each other, it can be seen that Example 4 in which the pure alumina and the La-containing alumina were contained in the catalytic layer at a ratio of 1:1 had the lowest T25 and the highest C300 and C400. This is presumably because when the La-containing alumina and the pure alumina were contained at a ratio of 1:1, the total volume of the aluminas would have turned into a moderate one in terms of gas diffusion and the catalyst and the exhaust gas would have been brought into frequent contact with each other, thereby allowing the catalyst to exhibit sufficiently good performance. This indicates that the mixing ratio of the pure alumina and the La-containing alumina is most preferably about 1:1, preferably falls within the range of about 2:1 to about 1:2, but may alternatively fall in the range of about 8:1 to about 1:8.

As can be seen from the foregoing, using both of the pure alumina and the La-containing alumina as the alumina materials serving as a catalytic component of an exhaust gas purification catalyst allows for improving the $NO_x$ oxidation performance of the catalytic material. This suggests that a greater amount of $NO_2$ would be generated, and thus the PM burning performance would be improvable.

<On Catalyst-Loaded DPF>

The DPF 30 for collecting and burning off the PM will be described below.

[Configuration for DPF]

Figure 9:
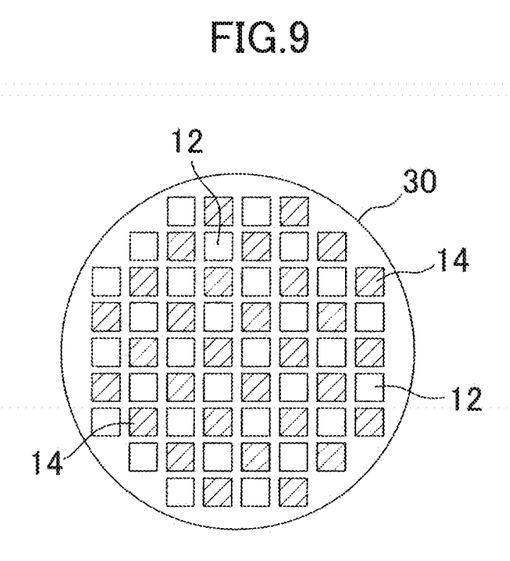
FIG. 9 is a front view schematically illustrating a particulate filter.
Figure 10:
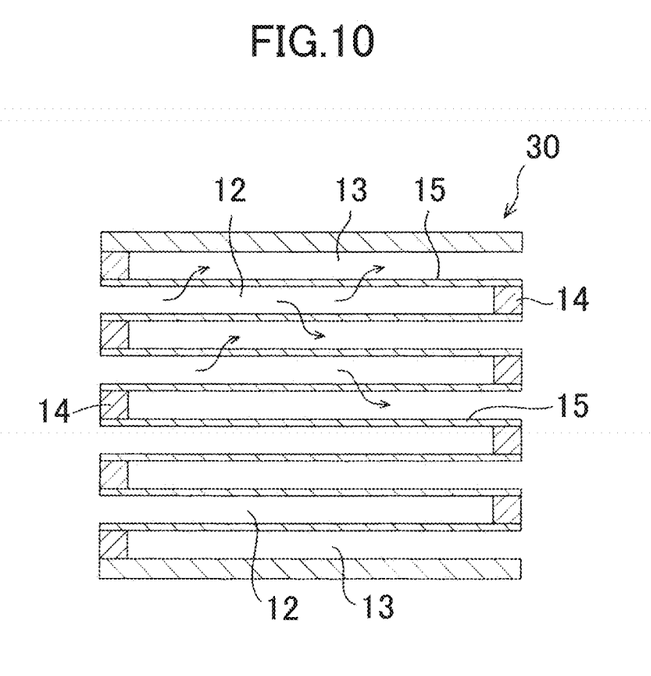
FIG. 10 is a vertical cross-sectional view schematically illustrating the particulate filter.

As schematically shown in FIGS. 9 and 10, the DPF 30 has a honeycomb structure, and includes multiple exhaust gas passages 12, 13 extending parallel to each other. Specifically, exhaust gas inflow passages 12, each having its downstream end closed with a plug 14, and exhaust gas outflow passages 13, each having its upstream end closed with a plug 14, are arranged alternately. Each exhaust gas inflow passage 12 and an exhaust gas outflow passage 13 adjacent to the passage 12 are separated by a thin barrier wall 15. In FIG. 9, the plugs 14 at the respective upstream ends of the exhaust gas outflow passages 13 are hatched.

Figure 11:
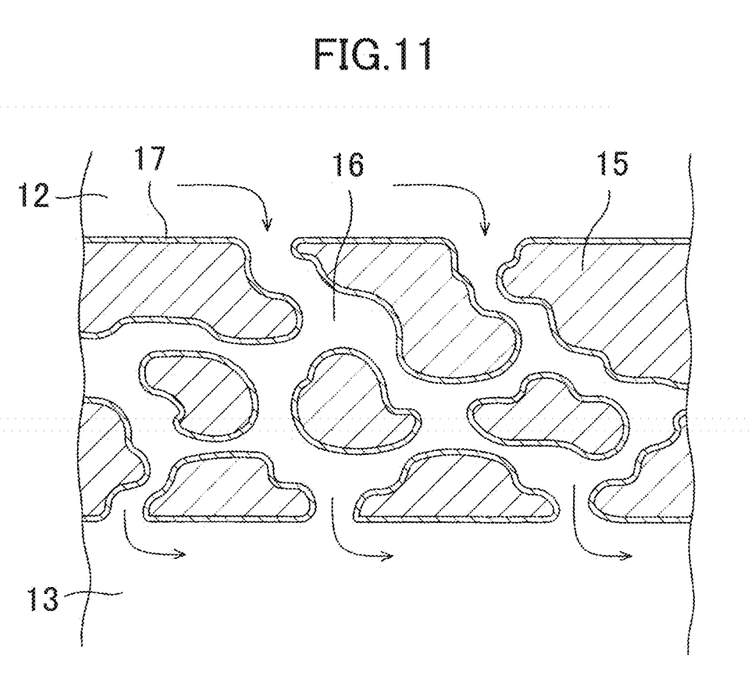
FIG. 11 is an enlarged cross-sectional view schematically illustrating a wall between exhaust gas passages in the particulate filter.

A filter body of the DPF 30 including the barrier wall 15 is made of an inorganic porous material such as cordierite, SiC, $Si_3N_4$, SiAlON, and $AlTiO_3$. The exhaust gas that has entered the exhaust gas inflow passages 12 flows through the surrounding barrier walls 15 into the adjacent exhaust gas outflow passages 13 as indicated by arrows in FIG. 10. As shown in FIG. 11, each of the barrier walls 15 has minute pores (exhaust gas passages) 16 through which the exhaust gas inflow passages 12 communicate with the exhaust gas outflow passages 13, and the exhaust gas passes through the pores 16. The PM is mainly trapped by, and accumulated on, the walls of the exhaust gas inflow passage 12 and the walls of the pores 16.

A catalytic layer 17 is formed on the wall surfaces of the exhaust gas passages in the filter body (including the exhaust gas inflow passages 12, the exhaust gas outflow passage 13 and the pores 16). The catalytic layer is not necessarily formed on the wall surfaces that face the exhaust gas outflow passages 13.

[On Catalytic Layer]

A configuration for the catalytic layer 17 will be described next with reference to FIG. 12.

Figure 12:
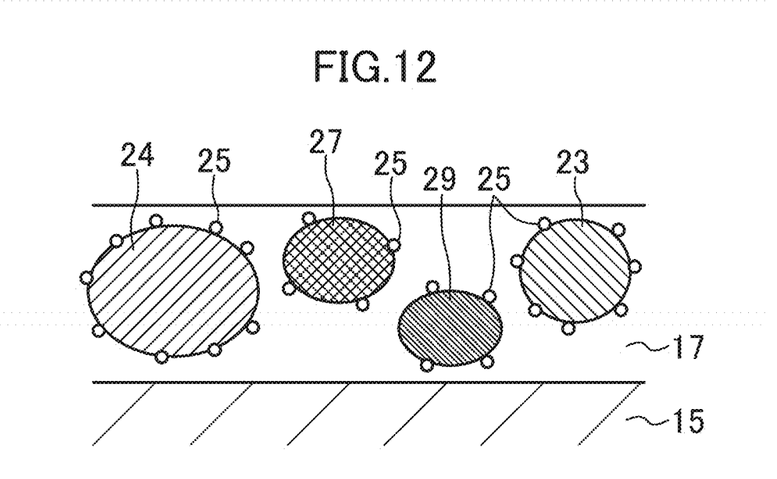
FIG. 12 is a cross-sectional view schematically illustrating the configuration of a catalytic layer formed on the wall of the exhaust gas passage in the particulate filter (a substrate).

As shown in FIG. 12, the catalytic layer 17 contains multiple types of activated aluminas 23 and 24 and composite oxides 27 and 29 which release active oxygen. The catalytic layer 17 will be described in detail below.

The catalytic layer 17 contains, as the multiple types of activated aluminas, a pure alumina (a first alumina) 23 containing no additives and a La-containing alumina (a second alumina) 24 containing about 4 mass % of La as an additive, just like the catalytic layer 22 shown in FIG. 2. Pt 25 is loaded on each of the pure alumina 23 and the La-containing alumina 24. Containing the Pt-loaded aluminas, the catalytic layer 17 has the ability to oxidize NO into $NO_2$ with high efficiency, and thus allows for burning the PM satisfactorily. Further, since the pure alumina and the La-containing alumina bulkier than the pure alumina are used as the activated aluminas, a total volume of the catalytic layer is reducible as compared with the case where only the La-containing alumina is used. This allows for reducing the occurrence of inconveniences such as frequent clogging of the filter.

As the composite oxides which release active oxygen, a CeZr-based composite oxide 27 containing Ce and Zr, and a Zr-based composite oxide 29 free from Ce and containing Zr are used. In this embodiment, the CeZr-based composite oxide 27 is a Rh-doped CeZrNd composite oxide (Rh-doped $CeZrNdO_x$) containing Rh as solid solution in a CeZrNd composite oxide, and the Zr-based composite oxide 29 is a ZrNdPr composite oxide ($ZrNdPrO_x$). Pt 25 is also loaded on each of the CeZr-based composite oxide 27 and the Zr-based composite oxide 29. The Zr-based composite oxide 29 preferably has an average pore diameter of 20 nm to 60 nm. In general, in the DPF 30 having a significantly high gas space velocity, the flow rate of the exhaust gas is so high that the exhaust gas flows near the surface layer of the oxide. If such a Zr-based composite oxide 29 having a relatively large pore diameter is used, the exhaust gas may be brought into frequent contact with not only the surface layer of the oxide, but also the pores in the oxide, and thus active oxygen may be generated efficiently. This allows for accelerating the burning of the PM.

In a preferred embodiment, the total amount of the multiple types of activated aluminas loaded is 4 g/L to 6 g/L, the amount of the CeZr-based composite oxide loaded is 4 g/L to 6 g/L, and the amount of the Zr-based composite oxide loaded is 6 g/L to 9 g/L. If the pure alumina and the La-containing alumina are used as the multiple types of activated aluminas, they are preferably contained at a mass ratio of the pure alumina/the La-containing alumina=1/8 to 4/1. The total amount of Pt loaded on the mixture of the multiple types of activated aluminas is preferably 0.3 g/L to 0.4 g/L. The amount of Pt loaded on the CeZr-based composite oxide is preferably 0.07 g/L to 1.0 g/L, and the amount of Pt loaded on the Zr-based composite oxide is preferably 0.07 g/L to 1.0 g/L.

[Method of Making DPF]

A method of making the DPF 30 will be described below.

The activated aluminas used such as the La-containing alumina and the pure alumina and the ZrCeNd composite oxide used may be commercially available powders. The Rh-doped CeZrNd composite oxide as the CeZr-based composite oxide may be prepared in the same manner as in the method of making the DOC 20 described above.

On the activated aluminas 23 and 24, Pt may be loaded using ethanolamine Pt in the same manner as in the method of making the DOC 20 as described above.

Next, a method for loading Pt on the Rh-doped CeZrNd composite oxide particles 27 and the ZrNdPr composite oxide particles 29 will be described below.

First, ion exchanged water is added to the Rh-doped CeZrNd composite oxide particles and the ZrNdPr composite oxide particles to prepare slurry, which is then stirred sufficiently with a stirrer or any other suitable tool. Then, a predetermined amount of ethanolamine Pt is dripped to the slurry being stirred, and the mixture thus obtained is stirred sufficiently. Thereafter, the product thus obtained is further stirred under heat to completely vaporize the water. After the evaporation, the product thus obtained is baked in the air at 500° C. for 2 hours to load Pt on each of the composite oxide particles.

The Pt-loaded composite oxide particles and the Pt-loaded alumina particles obtained in the above-described manner are mixed, and ion exchanged water and a binder are added to the mixture to obtain slurry. The slurry is applied to a filter, dried, and then baked at 500° C. for 2 hours to obtain a DPF (catalyst-loaded particulate filter) 30.

Examples

Examples of the DPF according to the present invention will be described below. In the following examples, the carbon burning rate was studied on each of the DPFs including the catalytic layers having the compositions described below.

In each of the following examples, a catalytic material containing a Pt-loaded pure alumina, a Pt-loaded La-containing alumina, Pt-loaded $ZrNdPrO_x$ and Pt-loaded Rh-doped $CeZrNdO_x$ was prepared and used in the above-described manner. The pure alumina and the La-containing alumina containing 4 mass % of La respectively had the spectra shown in FIG. 4 and the pore size distributions shown in FIG. 5. The pure alumina had an average pore diameter of 10.07 nm and a pore volume of 0.537 cm$^3$/g, while the La-containing alumina had an average pore diameter of 13.15 nm and a pore volume of 0.822 cm$^3$/g.

The $ZrNdPrO_x$ had a specific surface area of 35 m$^2$/g, a pore volume of 0.23 cm$^3$/g, and an average pore diameter of 25.6 nm. The following Table 2 shows the amounts of the oxides loaded and contained in the respective catalytic layers of Examples 7-12 and Comparative Examples 2 and 3. The ZrNdPr composite oxide had a composition of $ZrO_2:Nd_2O_3:Pr_2O_3$=70:12:18 (by weight), and the Rh-doped CeZrNd composite oxide (Rh/CeZrNdO$_x$) had a composition of Rh:CeO$_2$:ZrO$_2$:Nd$_2$O$_3$=0.1:28:62:10 (by weight).

TABLE 2

| | | Catalytic component | g/L | Al$_2$O$_3$ ratio |
|---|---|---|---|---|
| Example 7 | | ZrNdPrO$_x$ | 7.79 | La$_2$O$_3$—Al$_2$O$_3$:Pure-Al$_2$O$_3$ = |
| | | Rh/CeZrNdO$_x$ | 5.19 | 8:1 |
| | Al$_2$O$_3$ | Total | 5.19 | |
| | | La$_2$O$_3$—Al$_2$O$_3$ | 4.61 | |
| | | Pure-Al$_2$O$_3$ | 0.58 | |
| Example 8 | | ZrNdPrO$_x$ | 7.79 | La$_2$O$_3$—Al$_2$O$_3$:Pure-Al$_2$O$_3$ = |
| | | Rh/CeZrNdO$_x$ | 5.19 | 4:1 |
| | Al$_2$O$_3$ | Total | 5.19 | |
| | | La$_2$O$_3$—Al$_2$O$_3$ | 4.15 | |
| | | Pure-Al$_2$O$_3$ | 1.04 | |
| Example 9 | | ZrNdPrO$_x$ | 7.79 | La$_2$O$_3$—Al$_2$O$_3$:Pure-Al$_2$O$_3$ = |
| | | Rh/CeZrNdO$_x$ | 5.19 | 2:1 |
| | Al$_2$O$_3$ | Total | 5.19 | |
| | | La$_2$O$_3$—Al$_2$O$_3$ | 3.46 | |
| | | Pure-Al$_2$O$_3$ | 1.73 | |
| Example 10 | | ZrNdPrO$_x$ | 7.79 | La$_2$O$_3$—Al$_2$O$_3$:Pure-Al$_2$O$_3$ = |
| | | Rh/CeZrNdO$_x$ | 5.19 | 1:1 |
| | Al$_2$O$_3$ | Total | 5.19 | |
| | | La$_2$O$_3$—Al$_2$O$_3$ | 2.6 | |
| | | Pure-Al$_2$O$_3$ | 2.19 | |
| Example 11 | | ZrNdPrO$_x$ | 7.79 | La$_2$O$_3$—Al$_2$O$_3$:Pure-Al$_2$O$_3$ = |
| | | Rh/CeZrNdO$_x$ | 5.19 | 1:2 |
| | Al$_2$O$_3$ | Total | 5.19 | |
| | | La$_2$O$_3$—Al$_2$O$_3$ | 1.73 | |
| | | Pure-Al$_2$O$_3$ | 3.46 | |

TABLE 2-continued

| | Catalytic component | g/L | Al$_2$O$_3$ ratio |
|---|---|---|---|
| Example 12 | ZrNdPrO$_x$ | 7.79 | La$_2$O$_3$—Al$_2$O$_3$:Pure-Al$_2$O$_3$ = |
| | Rh/CeZrNdO$_x$ | 5.19 | 1:4 |
| Al$_2$O$_3$ | Total | 5.19 | |
| | La$_2$O$_3$—Al$_2$O$_3$ | 1.04 | |
| | Pure-Al$_2$O$_3$ | 4.15 | |
| Comparative Example 2 | ZrNdPrO$_x$ | 7.79 | La$_2$O$_3$—Al$_2$O$_3$ only |
| | Rh/CeZrNdO$_x$ | 5.19 | |
| Al$_2$O$_3$ | Total | 5.19 | |
| | La$_2$O$_3$—Al$_2$O$_3$ | 5.19 | |
| | Pure-Al$_2$O$_3$ | 0 | |
| Comparative Example 3 | ZrNdPrO$_x$ | 7.79 | La$_2$O$_3$—Al$_2$O$_3$ only |
| | Rh/CeZrNdO$_x$ | 5.19 | |
| Al$_2$O$_3$ | Total | 5.19 | |
| | La$_2$O$_3$—Al$_2$O$_3$ | 5.19 | |
| | Pure-Al$_2$O$_3$ | 0 | |

The catalytic materials of Examples 7-12 contained ZrCeNdO$_x$ and Rh-doped CeZrNdO$_x$ as the composite oxides, and a pure alumina (Pure-Al$_2$O$_3$) and a La-containing alumina (La$_2$O$_3$—Al$_2$O$_3$) as the activated aluminas. As can be seen from Table 2, Examples 7-12 have the same composition except the ratio between the pure alumina and La-containing alumina contained in the catalytic materials. In Examples 7-12, 0.33 g/L in total of Pt was loaded on the activated aluminas, and 0.17 g/L in total of Pt was loaded on the composite oxides.

On the other hand, Comparative Examples 2 and 3 are different from Examples 7-12 in that each of these comparative examples contained, as the activated alumina, only the La-containing alumina and no pure alumina. In Comparative Example 2, Pt (0.5 g/L) was loaded only on the composite oxides. In Comparative Example 3, 0.33 g/L of Pt was loaded on the La-containing alumina and 0.17 g/L in total of Pt was loaded on the composite oxides. As the Pt material, Pt—P salt was used in Comparative Examples 2 and 3, while ethanolamine Pt was used in Examples 7-12.

Each of the catalytic materials of Examples and Comparative Examples was turned into slurry in the above-described manner, which was then applied onto a substrate for a particulate filter made of SiC (volume: 25 mL, cell wall thickness: 16 mil, number of cells: 178 cpsi) to obtain a sample filter having a catalytic layer. In each of Examples and Comparative Examples, the amount of wash coat was 20 g/L.

A carbon burning rate test performed on these sample filters will be described below.

First, as a pretreatment, the sample filter was loaded into a model gas flow reactor, and a model gas (200 ppmC of C$_3$H$_6$, 400 ppm of CO, 100 ppm of NO, 10% of O2, 10% of H$_2$O, 4.5% of CO$_2$ and N$_2$ as the balance) was introduced in the reactor (at a rate of 40 L/min), while the temperature of the model gas was raised to 600° C. at a rate of 30° C./min. Then, the temperature was allowed to fall to room temperature while keeping the gas composition unchanged.

After the pretreatment was performed, the sample filter was removed from the model gas flow reactor, and carbon was deposited on the sample filter. Specifically, the deposition of carbon was performed such that 5 g of carbon was deposited per 1 L of the volume of the substrate. After carbon in an amount corresponding to 5 g/L was stirred in ion exchanged water with a stirrer, an inlet side of the sample filter was immersed in the solution thus obtained, and an aspirator was used for suction on an outlet side of the filter. Then, the sample filter was placed on a water-absorbing sheet to remove extra water, and dried at 150° C. for an hour.

Thereafter, the sample filter was loaded into the model gas flow reactor again, and the temperature of N$_2$ gas being introduced therein was raised. After the temperature of the gas at the filter inlet was stabilized at 580° C., a model exhaust gas (including 7.5% of O2, 300 ppm of NO, and N$_2$ as the balance) was introduced in place of the N$_2$ gas at a space velocity of 96000/h. Then, the concentrations of CO and CO$_2$ generated in the gas through the burning of carbon were measured in real time at the outlet of the filter. From the concentrations thus measured and the following formula, the carbon burning rate (which is the amount of the PM burned per unit time) was calculated at regular time intervals.

Carbon burning rate (g/h)={gas flow rate (L/h)× [(CO+CO$_2$) concentration (ppm)/(1×10$^6$)]}×12 (g/mol)/22.4 (L/mol)

Figure 13:
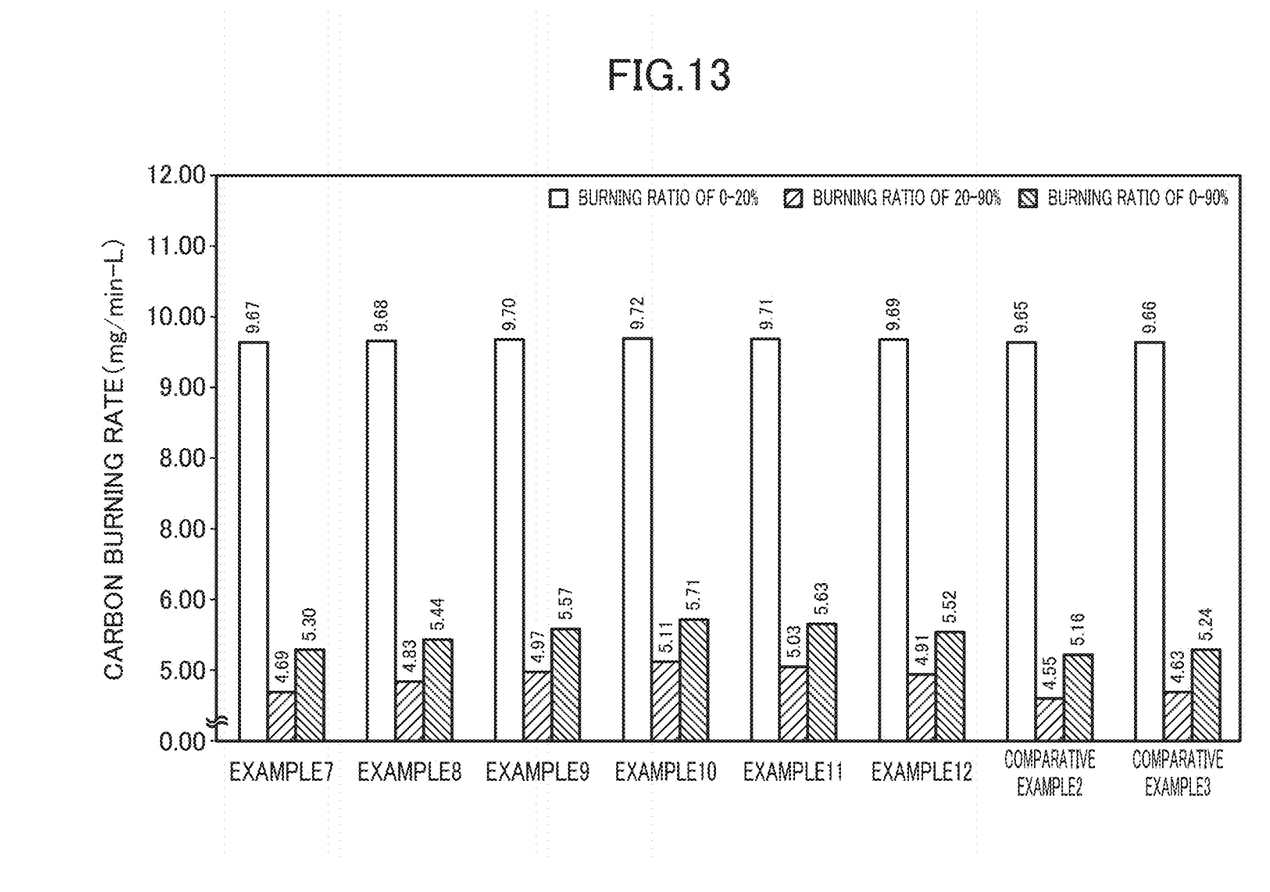
FIG. 13 is a graph illustrating carbon burning performance of particulate filters of Examples 7-12 and Comparative Examples 2 and 3.

Variation with time in the integrated amount of carbon burned was obtained based on the carbon burning rate calculated at regular time intervals. Then, the carbon burning rate (the amount of the PM burned per liter of the filter per minute (mg/min-L)) was calculated based on the amounts of time it took for the carbon burning ratio to increase from 0% to 20%, from 20% to 90% and from 0% to 90% and the integrated amount of carbon burned during these periods of time. FIG. 13 shows the results.

As shown in FIG. 13, compared with Comparative Examples 2 and 3, Examples 7-12 containing both of the pure alumina and the La-containing alumina exhibited higher PM burning performance. This is because Examples 7-12 not only solve the problem of the bulkiness of the La-containing alumina, but also have higher NO$_x$ oxidation performance, and thus produce a larger amount of NO$_2$ which contributes to the burning of the PM. As can be seen from the pore size distributions shown in FIG. 5, the La-containing alumina has a larger pore diameter than the pure alumina Thus, a larger amount of Pt would have entered the pores of the La-containing alumina, while the pure alumina would have allowed a greater number of its Pt particles to stay on its surface than the La-containing alumina. This suggests that the amount of Pt to come into contact with the exhaust gas would have increased so much as to promote the oxidation of NO$_x$ in these Examples 7-12.

In addition, the La-containing alumina, which is basic, has lower Pt absorptivity than the pure alumina which is amphoteric and has an acid point. Thus, it is presumed that the catalysts of Examples 7-12 containing the pure alumina having high Pt absorptivity would exhibit better NO oxidation performance. When Examples 7-12 were compared with each other, Example 10 exhibited the highest PM burning performance, which suggests that the catalyst containing the pure alumina and the La-containing alumina at a ratio of 1:1 would be particularly preferable. This is presumably because when the La-containing alumina and the pure alumina were contained at a ratio of 1:1, the total volume of the aluminas would have turned into a moderate one in terms of gas diffusion and the catalyst and the exhaust gas would have been brought into frequent contact with each other, thereby allowing the catalyst to exhibit sufficiently good performance.

As can be seen from the foregoing, a catalyst-loaded particulate filter containing, as catalytic components, a Pt-loaded pure alumina in addition to a Pt-loaded La-containing alumina, allows for improving PM burning performance.

DESCRIPTION OF REFERENCE CHARACTERS

10 Exhaust Gas Channel
12 Exhaust Gas Inflow Passage (Exhaust Gas Passage)
13 Exhaust Gas Outflow Passage (Exhaust Gas Passage)
14 Plug
15 Barrier Wall
16 Pore (Exhaust Gas Passage)
20 Diesel Oxidation Catalyst (DOC)
21 Honeycomb Substrate
22 Catalytic Layer
23 Pure Alumina (First Alumina)
24 La-containing Alumina (Second Alumina)
25 Platinum (Pt)
26 Palladium (Pd)
27 CeZr-based Composite Oxide
28 Zeolite
29 Zr-based Composite Oxide
30 Diesel Particulate Filter (DPF)

The invention claimed is:

1. An exhaust gas purification catalyst disposed in an exhaust gas channel of an engine and comprising a catalytic layer provided on a substrate, wherein
the substrate is a particulate filter,
the catalytic layer contains multiple types of γ-aluminas which are different in composition, Pt loaded on the multiple types of γ-aluminas, a composite oxide which releases active oxygen, and Pt loaded on the composite oxide, and
a total amount of Pt loaded on each of the multiple types of γ-aluminas is larger than a total amount of Pt loaded on the composite oxide.

2. The exhaust gas purification catalyst of claim 1, wherein
the multiple types of γ-aluminas include a first alumina containing no additives and a second alumina containing La as an additive.

3. The exhaust gas purification catalyst of claim 1, wherein
the composite oxide includes a Zr-based composite oxide free from Ce and containing Zr and a CeZr-based composite oxide containing Ce and Zr.

4. The exhaust gas purification catalyst of claim 3, wherein
the Zr-based composite oxide is a ZrNdPr-containing composite oxide having an average pore diameter of 20 nm to 60 nm.

5. A method of making an exhaust gas purification catalyst disposed in an exhaust gas channel of an engine and comprising a catalytic layer provided on a substrate, the method comprising:
providing a particulate filter as the substrate;
mixing together multiple types of γ-aluminas which are different in composition and loading Pt on a mixture thus obtained;
loading Pt on a composite oxide which releases active oxygen such that a total amount of Pt loaded on each of the multiple types of γ-aluminas is larger than a total amount of Pt loaded on the composite oxide; and
mixing the Pt-loaded mixture of the multiple types of γ-aluminas with the Pt-loaded composite oxide to obtain a mixture, and applying the obtained mixture to the filter.

6. The method of claim 5, wherein
ethanolamine Pt is used as a Pt material to be loaded on the mixture of the multiple types of γ-aluminas and the composite oxide.

* * * * *